(12) United States Patent
Bostaph

(10) Patent No.: US 7,668,307 B2
(45) Date of Patent: Feb. 23, 2010

(54) RECONFIGURABLE AND MOLDABLE ELECTRONIC DEVICE

(75) Inventor: Joseph W. Bostaph, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 498 days.

(21) Appl. No.: 11/606,543

(22) Filed: Nov. 30, 2006

(65) Prior Publication Data

US 2008/0132299 A1 Jun. 5, 2008

(51) Int. Cl.
*H04M 1/00* (2006.01)
*H04M 9/00* (2006.01)
(52) U.S. Cl. .................... 379/419; 455/575.1
(58) Field of Classification Search ............ 379/419; 455/90.3, 575.1; 361/600, 679.01
See application file for complete search history.

(56) References Cited

U.S. PATENT DOCUMENTS

| 6,453,155 B1 | 9/2002 | Hill et al. |
| 6,957,092 B2 | 10/2005 | Kotzin |

*Primary Examiner*—Tuan D Nguyen

(57) ABSTRACT

A portable electronic device (10, 24, 30, 40, 50, 60, 70, 80, 90, 100, 110, 120, 130) is provided having a base unit (12) and a plurality of add-on components (14), each encased within a moldable/conformal material (22). Each component (14) comprises component circuitry and communication circuitry for communicating with at least one of the base unit (12) and one of the other components (14). The base unit (12) and the component circuitry of the plurality of add-on components (14) comprise the electronics for the portable electronic device. A moldable material (22) encases at least a portion of each of the plurality of components (14) and the base unit (12), wherein the moldable material (22) of all of the components (14) and base unit (12) may be joined to form the integrated portable electronic device.

17 Claims, 2 Drawing Sheets

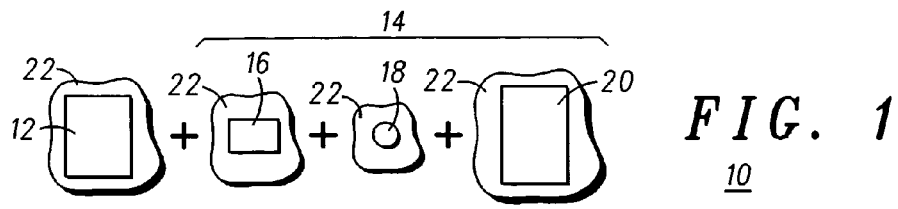
FIG. 1
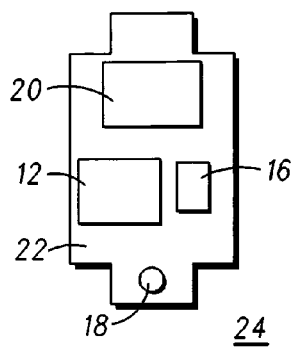
FIG. 2
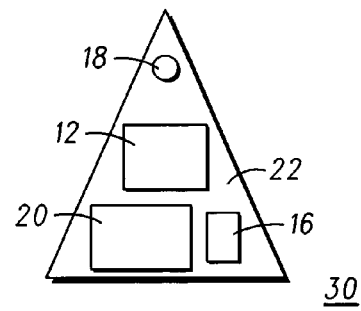
FIG. 3
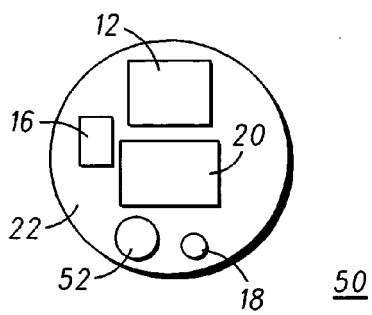
FIG. 5
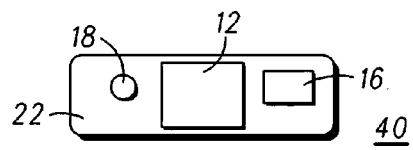
FIG. 4
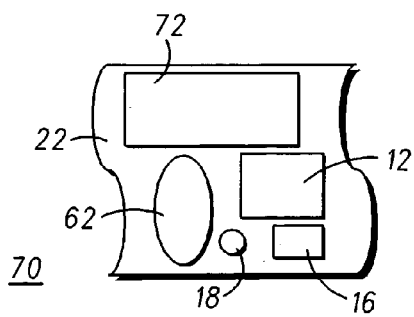
FIG. 6
FIG. 7

RECONFIGURABLE AND MOLDABLE ELECTRONIC DEVICE

FIELD OF THE INVENTION

The present invention generally relates to portable electronic devices and more particularly to a base portable electronic device having add-on components that may be joined with the base portable electronic device.

BACKGROUND OF THE INVENTION

The market for personal portable electronic devices, for example, cell phones, personal digital assistants (PDA's), digital cameras, and music playback devices (MP3), is very competitive. Manufacturers, distributors, service providers, and third party providers have all attempted to find features that appeal to the consumer. For example, service providers are continually looking to improve cell phone reception and access to the internet for down loading of information, music, and the like. Third party providers are constantly searching for the additional item that functions well with the manufacture's product. Manufactures are constantly improving their product with each model in the hopes it will appeal to the consumer more than a competitor's product. Many times these manufacture's improvements do not relate directly to the functionality of the product.

The look and feel of personal portable electronics devices is now a key product differentiator and one of the most significant reasons that consumers choose specific models. From a business standpoint, these outstanding designs (form and appearance) increase market share and margin.

Consumers are enamored with sleek designs and other customizable features, e.g., housing color or form factor. These features reflect personal style. Consumers select them for some of the same reasons that they select clothing styles, clothing colors, and fashion accessories. These two worlds have not merged because consumers have multiple sets of clothing and generally only one personal electronic device (perhaps of each type), and this device has a single defined color or shape. In short, consumers have a very limited ability to match shapes of personal electronics devices to their clothing, their accessories, their car, or their mood. Plastic snap-on covers for devices such as cell phones and MP3 players can be purchased in pre-defined patterns and colors. These snap-on covers are quite popular, and yet they provide a very limited customization capability.

Electronic devices are highly individualized, with users desiring to customize their devices to reflect their personalities and feelings. This desire extends to functionality also. For example, users may prefer to have a device with a certain type of keyboard and a certain type of display that are not found on the same commercially available device. Or, the user may wish to upgrade from one type of speaker to another.

Accordingly, it is desirable to provide an electronic device including a base portable electronic device having add-on components that may be joined with the base portable electronic device. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A portable electronic device is provided having add-on components that may be joined with the portable electronic device. The portable electronic device includes electronic circuitry and comprises a plurality of components. Each of the components includes component circuitry and communication circuitry for communicating with at least one of the other components, wherein the component circuitry and the communication circuitry in all of the components comprise the electronic circuitry of the portable electronic device. A moldable material encases at least a portion of each of the plurality of components, wherein the moldable material of all of the components may be joined to form an integrated portable electronic device, and in a desired shape.

BRIEF DESCRIPTION OF THE DRAWINGS

The present invention will hereinafter be described in conjunction with the following drawing figures, wherein like numerals denote like elements, and FIGS. 1-7 are a schematic representation of various exemplary embodiments;

DETAILED DESCRIPTION OF THE INVENTION

Figure 8:
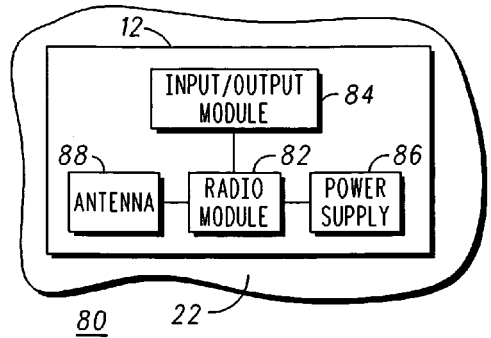
FIG. 8 is a first embodiment of a cell phone in a first form factor.

The following detailed description of the invention is merely exemplary in nature and is not intended to limit the invention or the application and uses of the invention. Furthermore, there is no intention to be bound by any theory presented in the preceding background of the invention or the following detailed description of the invention.

An electronic device, including a plurality of add-on components, disclosed herein is encased within a moldable/conformable material. The moldable/conformable material generally encasing each component has a general shape depending on the component shape/design. The encased components may be combined into many base shapes and molded into various designs. The encased components may be taken apart and reconfigured into different shapes and molded together again. When the components are joined, the molding material of each actually bonds to the adjoining component. Each encased component or the mixture of encased components may be formed to desired shapes. The moldable/conformable material would comprise an original color, which may be changed by adding one or more dyes. The components communicate either wirelessly with each other within its local area network or through a tethered connection. This tethered connection can provide power as well as communication between components.

An exemplary embodiment comprises a cell phone including a base module (that may also generally be referred to as a component) comprising, for example, a receiver/transmitter, microphone, speaker, power supply, and an antenna. Other components generally encased in the moldable/conformable material may include, for example, a display, speaker, keypad (qwerty or numeric), camera, music controls, mouse, or electronic charms/jewelry, e.g., for notification. While it may be difficult to imagine a base module without a display, by making the display an add-on component, the user may select one or more of several different types of displays. And if the user decides later to upgrade, it may easily be accomplished by removing the specified component and replacing it with an upgraded version. Or if the component breaks, it may easily be replaced.

The basic concept described herein is illustrated schematically in FIGS. 1-7 and the different shapes that may be obtained. The electronic device 10 as shown in FIG. 1 includes, for example, a base module 12, and other components 14 including an accessory 16, a speaker/microphone 18, and a display 20. A moldable/conformable material 22 generally encases each of the base module and the components. FIGS. 2 and 3 represent schematically how each of the base module 12 and the components 14 may be combined into a single electronic device 24 and 30, respectively, to form different shapes.

A device 40 comprising a strip or band shape, includes a basic module 12, an accessory 16, and a speaker/microphone 18 as shown in FIG. 4, and may be modified by adding a display 20 and another accessory 52 (FIG. 5) and re-molded into a disk or ball shape electronic device 50. The base module 12 (electronic device 60) may also be modified by adding a display 20 and an input module 62 (FIG. 6). And further, the base module 12 (electronic device 70) may be modified by adding the input module 62 and a larger display 72 (FIG. 7).

FIG. 8 is an exemplary block diagram of a mobile communication device 80 according to one embodiment of the invention. The mobile communication device 80 may be a telephone, a wireless telephone, a cellular telephone, a PDA, a modem, a pager, or any other device that is capable of sending and receiving communications. Preferably, the mobile communication device 80 is a mobile communication device such as a portable phone. The mobile communication device 80 can include a radio module 82, an audio input/output module 84, a power supply 86, and an antenna 88. All of these devices 82, 84, 86, 88 comprise the base unit 12 which is at least partially encased in the moldable/conformal material 22.

Figure 9:
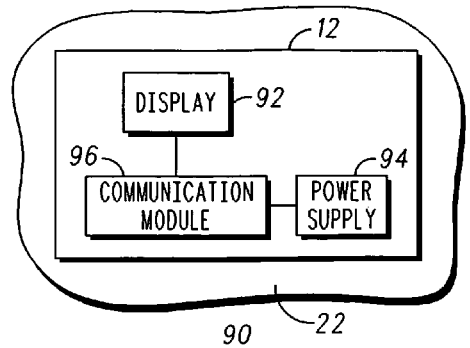
FIG. 9 is a second embodiment of a cell phone in a second form factor.

FIG. 9 is an exemplary block diagram of a component 14 according to one embodiment of the invention. The component 14 may be, for example, one or more of a display, speaker, input/output module, or camera that may function and communicate with the mobile communication device 80. The component 14 shown in FIG. 9 comprises a display 92, a power supply 94 and a communication module 96 for communicating with the base unit 12. Components 14 may communicate with the base unit 12 or other components 14. Components 14 can also access power from other components 14 or base unit 12.

Figure 10:
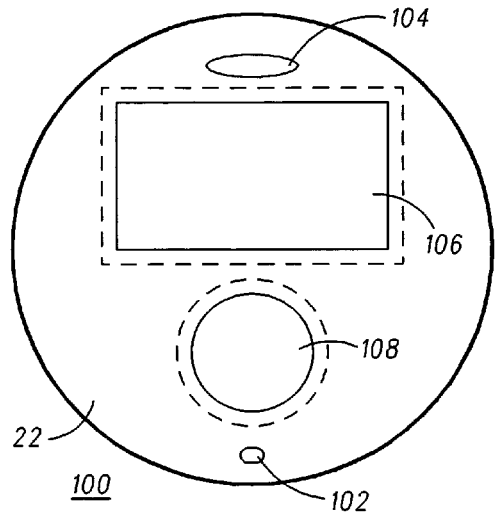
FIG. 10 is a third embodiment of a cell phone in a third form factor.

FIG. 10 is a cell phone 100 comprising a base unit (contained within the cell phone 100) wherein the moldable/conformable material 22 has been shaped into a circle with a microphone 102 and a speaker 104 at opposed sides. A display 106 and an input device 108 have been placed between the microphone 102 and speaker 104 and the moldable/conformable material 22 around the display 106 and the input device 108 has been worked into the moldable/conformable material 22 surrounding the microphone 102, the speaker 104, and the base unit 12.

Figure 11:
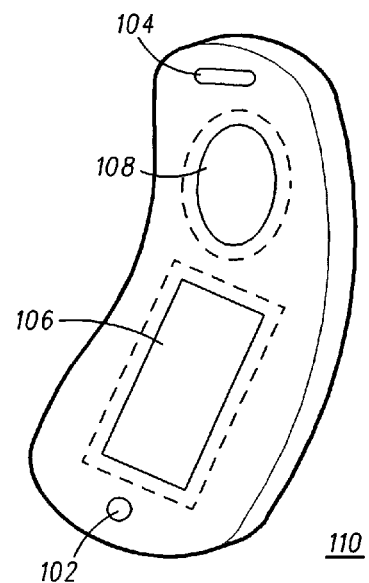
FIG. 11 is a fourth embodiment of a cell phone in a fourth form factor.

FIG. 11 is a cell phone 110 comprising a base unit (contained within the cell phone 110) wherein the moldable/conformable material 22 has been shaped into an elongated, angled form with a microphone 102 and a speaker 104 at opposed ends. The cell phone 100 may be held so the speaker 104 is positioned contiguous to an ear while the microphone 102 is positioned near the mouth due to the angle of the structure. A display 106 and an input device 108 have been placed between the microphone 102 and speaker 104. The moldable/conformable material 22 around the display 106 and the input device 108 has been worked into the moldable/conformable material 22 surrounding the microphone 102, the speaker 104, and the base unit (contained within the cell phone 110).

Figure 12:
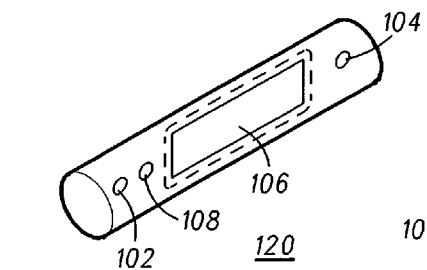
FIG. 12 is a fifth embodiment of a cell phone in a fifth form factor.

FIG. 12 illustrates a cell phone 120 taking a cylindrical shape similar to that of a lipstick holder or pen. A base unit includes a microphone 102 and a speaker 104 at opposed ends. A display 106 and an input device 108 have been placed between the microphone 102 and speaker 104. The moldable/conformable material 22 around the display 106 and the input device 108 has been worked into the moldable/conformable material 22 surrounding the microphone 102, the speaker 104, and the base unit (contained within the cell phone 120).

Figure 13:
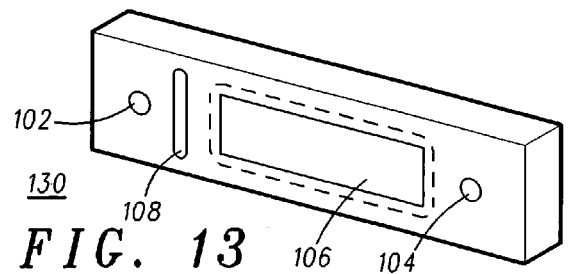
FIG. 13 is a sixth embodiment of a cell phone in a sixth form factor.

FIG. 13 illustrates a cell phone 130 in the form of a wrist band suitable for being molded into the flat shape shown, or molded around the wrist when not in use. A base unit includes a microphone 102 and a speaker 104 at opposed ends. A display 106 and an input device 108 have been placed between the microphone 102 and speaker 104. The moldable/conformable material 22 around the display 106 and the input device 108 has been worked into the moldable/conformable material 22 surrounding the microphone 102, the speaker 104, and the base unit (contained within the cell phone 130).

The moldable/conformal material 22 may be any suitable material that is moldable to provide structure for the desired form for the base unit 12 and the other components 14 and is flexible to be manipulated by a user. The moldable/conformal material 22 is capable of being molded into a shape and will retain that shape until it is molded into another shape. Such moldable/conformal material 22 may be, for example, a gel, a polymer, clay or bendable plastic; however, preferably is a re-usable, non-toxic, non-staining modeling compound such as that disclosed in U.S. Pat. No. 3,167,440 (Play-Doh™) that is primarily a mixture of wheat flour, water, deodorized kerosene or another petroleum distillate (which provides the smooth texture), salt, a drying agent such as borax (which deters mold), an alum-based hardening agent, and colorings and perfume. However, the moldable/conformal material 22 will by pliable even after being exposed to air and will not dry out within a reasonable time frame. A wetting agent may be added periodically. Furthermore, the moldable/conformal material 22 is attachable (by massaging the moldable/conformal material 22) to the same material encasing another of the base unit 12 and component 14.

The moldable/conformal material 22 encasing the basic module 12 and other components 14 may be made of the same or different materials. Disposable components 14 may be encased within a moldable/conformal material 22 that is less expensive and of lower quality than a moldable/conformal material 22 encasing a more expensive, higher quality component. The disposable components 14 may be discarded and replaced with different types of components 14 at less expense than if they were encased within a more expensive moldable/conformal material 22.

The base unit 12 and components 14 may be placed within or on the moldable/conformal material 22 using any suitable means. For example, the base unit 12 and components 14 may be embedded within the moldable/conformal material 22. The moldable/conformal material 22 may be placed, for example, by pouring or shaping around the base unit 12 and components 14. The base unit 12 and components 14 may simply be held in position by the moldable/conformal material 22, glued into or onto the moldable/conformal material 22, molded with the moldable/conformal material 22, or adhered to the moldable/conformal material 22 using any suitable adhesive. On one exemplary embodiment, the moldable/conformal material 22 is manufactured so that the base unit 12 or components 14 can be press-fitted or snap-fitted into the moldable/conformal material 22. In this manner, although the moldable/conformal material 22 is flexible, the base unit and components 14 maintain the appropriate connections for functionality.

The base unit 12 may be any suitable communication module that enables the device 10, optionally in conjunction with the components 14, to communicate with other devices and systems. For example, the base unit 12 may include a wireless module. Such a wireless module may be one unit incorporating user-input interface components, user-output interface components and processing components or other components.

The components 14 may comprise a chip set. Such a chip set may be, for example, for a short range wireless device. One such chip set is Bluetooth. Such a chip set module can be used according to the Bluetooth protocol, as is well known in the art.

The base unit 12 may be a wireless cellular transceiver. Such a transceiver may be, for example, a CDMA, TDMA, GSM, or IDEN transceiver. For example, a wireless cellular transceiver can be used according to a CDMA protocol, as is well known in the art.

The power source (not shown) for each of the base unit 12 and components 14 may be any power source, including for example, a rechargeable battery or standard DC power source. The power source may comprise fuel cells or a battery of limited duration and power such as disposable batteries.

The base unit 12 may include a microprocessor which can coordinate and manage one or more of the components 14. In one exemplary embodiment, the microprocessor may operate computer readable code that is capable of managing a variety of communication functions. The microprocessor may also incorporate a radio frequency device such as a chip set, a Bluetooth chip set or a CDMA module.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An integrated portable electronic device including electronic circuitry, the portable electronic device comprising:
a plurality of components, wherein each of the components comprises:
component circuitry;
communication circuitry for communicating with at least one of the other components, wherein the component circuitry and the communication circuitry in all of the plurality of components comprise the electronic circuitry; and
moldable material encasing at least a portion of each of the plurality of components, wherein the moldable material of all of the components may be bonded together to form the integrated portable electronic device;
wherein the communication circuitry in at least two of the plurality of components comprises wireless communication circuitry.

2. The integrated portable electronic device of claim 1 wherein the plurality of components comprise a mobile communication device.

3. The integrated portable electronic device of claim 1 wherein the component circuitry within one of the plurality of components comprises an RF transmitter/receiver.

4. The integrated portable electronic device of claim 1 wherein each component comprises a power source.

5. The integrated portable electronic device of claim 1 further comprising a power source within at least one of the plurality of components for providing power to at least two of the plurality of components.

6. The integrated portable electronic device of claim 1 wherein the plurality of components comprise at least one of the group comprising ear phones, notification jewelry, a display, an input/output device, a speaker, a microphone, and a camera.

7. The integrated portable electronic device of claim 1 wherein the moldable material comprises a modifiable color.

8. The integrated portable electronic device of claim 1 further comprising an additional cosmetic component which may be integrated within the moldable material.

9. A portable electronic device comprising:
a base unit including:
a first housing at least partially encased within a first moldable material; and
first electronics within the first housing; and
a component including:
a second housing at least partially encased within a second moldable material, the first and second moldable material capable of being molded together; and
second electronics within the second housing capable of communicating wirelessly with the first electronics.

10. The integrated portable electronic device of claim 9 wherein the base unit and the component comprises a mobile communication device.

11. The portable electronic device of claim 9 wherein each component comprises a power source.

12. The portable electronic device of claim 9 further comprising a power source within the base unit for providing power to the component.

13. The portable electronic device of claim 9 wherein the component comprises at least one of the group comprising ear phones, notification jewelry, a display, an input/output device, a speaker, a microphone, and a camera.

14. The portable electronic device of claim 9 wherein the moldable material comprises a modifiable color.

15. A portable electronic device comprising:
a base unit including:
a receiver/transmitter;
a power supply;
a microphone;
a speaker;
wireless communications circuitry for communicating with a component; and
a first moldable/conformal material at least partially encasing the receiver/transmitter, power supply, microphone, speaker; and
the component including:
one of a display, an input device, and a camera;
wireless communications circuitry for communicating with the base unit; and
a second moldable/conformal material at least partially encasing the one of a display, an input device, and a camera, wherein the base unit and component are joined by integratively molding the first and second molding material together.

16. The integrated portable electronic device of claim 15 wherein the base unit and the component comprise a communication device.

17. The portable electronic device of claim 15 further comprising a power source within the base unit for providing power to the component.

* * * * *